(12) United States Patent  (10) Patent No.: US 7,743,985 B2
Donnellan                  (45) Date of Patent:     Jun. 29, 2010

(54) METHOD AND APPARATUS FOR AN UP-TO-DATE TRANSPORTATION NOTIFICATION SYSTEM

(75) Inventor: Kevin G. Donnellan, North Brunswick, NJ (US)

(73) Assignee: Motorola, Inc., Schaumburg, IL (US)

( * ) Notice: Subject to any disclaimer, the term of this patent is extended or adjusted under 35 U.S.C. 154(b) by 1120 days.

(21) Appl. No.: 11/323,295

(22) Filed: Dec. 29, 2005

(65) Prior Publication Data
US 2007/0155416 A1    Jul. 5, 2007

(51) Int. Cl.
  *G07B 15/02*    (2006.01)
(52) U.S. Cl. ................................. 235/384; 235/375
(58) Field of Classification Search .............. 235/384, 235/375; 455/563
See application file for complete search history.

(56) References Cited

U.S. PATENT DOCUMENTS

| | | | |
|---|---|---|---|
| 5,999,882 A | 12/1999 | Simpson et al. | |
| 6,842,737 B1 | 1/2005 | Stiles | |
| 7,155,248 B2 | 12/2006 | Idnani | |
| 7,215,743 B2 | 5/2007 | Creamer et al. | |
| 7,266,611 B2 | 9/2007 | Jabri et al. | |
| 7,376,662 B2 | 5/2008 | Caparas et al. | |
| 7,427,024 B1 * | 9/2008 | Gazdzinski et al. | 235/384 |
| 2003/0154293 A1 | 8/2003 | Zmolek | |
| 2004/0073355 A1 | 4/2004 | Yates | |
| 2004/0131075 A1 | 7/2004 | Sinnarajan et al. | |
| 2004/0254956 A1 | 12/2004 | Volk | |
| 2005/0027436 A1 | 2/2005 | Yoshikawa et al. | |

FOREIGN PATENT DOCUMENTS

WO   WO/01/48678 A1   7/2001

OTHER PUBLICATIONS

List Management and Do-not-Disturb, Jun. 2004, V2.0.6, pp. 1-57.
Boise Traffic Cams, [retrieved on Mar. 19, 2005]. Retrieved from internet: <URL:www.boisetraffic.com/trafficcams.htm.
West Los Angeles County Traffic Report, [retrieved on Mar. 19, 2005]. Retrieved from Internet: <URL:www.signalalert.com/incidents.asp?Region=LA+West.
West Los Angeles County Traffic Report, [retrieved on Mar. 19, 2005]. Retrieved from Internet: <URL:www.signalalert.com/map.asp?Region=LA+West.
Using mobile to track road traffic jams, posted on Sep. 3, 2003, [retrieved on March 19, 2005]. Retrieved from Internet: <URL: www.cellular-news.com/story/9692.shtml.
Tracking car congestion using mobile phones, posted on Nov. 20, 2003, [retrieved on Mar. 19, 2005]. Retrieved from Internet: <URL: www.cellular-news.com/story/10153.shtml.

* cited by examiner

*Primary Examiner*—Edwyn Labaze
(74) *Attorney, Agent, or Firm*—Gary J. Cunningham

(57) ABSTRACT

A method for receiving up-to-date transportation information at a user entity (120) in a wireless communication system (100) includes requesting up-to-date transportation information (502), determining which up-to-date transportation information is desired (506), requesting access to the desired up-to-date transportation information (510), and obtaining the desired up-to-date transportation information and providing the desired up-to-date transportation information (516, 518) to the user entity (120) for presentation to the user.

16 Claims, 7 Drawing Sheets

METHOD AND APPARATUS FOR AN UP-TO-DATE TRANSPORTATION NOTIFICATION SYSTEM

FIELD OF THE INVENTION

The present invention generally relates to wireless communication systems, and more particularly relates to a method and apparatus for providing an up-to-date transportation information notification system for access to and notification of current transportation information.

BACKGROUND OF THE INVENTION

While commuting, it can be very helpful to a driver to have up-to-date transportation information to help him make commute-related decisions such as taking an earlier or later bus or train, or traveling a different route when traffic is stopped on a highway. For years, commuters could receive current traffic conditions from other drivers who request and receive current traffic conditions at their locations on a citizen band radio (CB). CB radio's channel 19 is an open channel which allows a CB user to identify their location to other CB users within transmission range, identify their location, and request current traffic conditions near that location. Updating traffic conditions by CB radio, however, is dependent upon having a CB radio user at a location useful to the commuter. In addition, CB radio is generally deployed in vehicles such as automobiles and trucks, and, therefore, is ineffective in providing up-to-date information on bus and train schedules.

Today's wireless communication devices, such as cellular telephones, have a multitude of functions in addition to the traditional point-to-point audio communications. Modern portable communication devices can receive and transmit multimedia signals, such as photos or videos, with or without accompanying audio and, in addition, can access internet sites and information therein. The internet has a multitude of sites, some of which provide transportation information which is updated regularly to keep the information current. For example, train and bus schedules are maintained at internet sites and daily statuses on train or bus delays, possibly providing up-to-the-minute departure and arrival information, can be accessed through such internet sites. In addition, many internet sites provide access to video images from highway cameras placed at various locations on the highways or bridges. To access these internet sites and the current information provided thereon, however, is problematic for a commuter with a cellular telephone or even with a cellular enabled computing device. All cellular access to the internet and surfing thereof is subject to the limitations of the user interface. and the limitations of the cellular system's connectivity to the internet. In addition, surfing the internet from a car while driving along a highway would take attention away from the task of driving. Also, surfing the internet takes time and by the time a commuter has located the appropriate traffic information, it may already be either out-of-date or no longer of interest to the commuter.

Thus, what is needed is a method and apparatus for an up-to-date transportation notification system which provides up-to-date transportation information to a commuter in a timely manner to allow the commuter to utilize the transportation information to for commute-related decisions. Furthermore, other desirable features and characteristics of the present invention will become apparent from the subsequent detailed description of the invention and the appended claims, taken in conjunction with the accompanying drawings and this background of the invention.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

Figure 1:
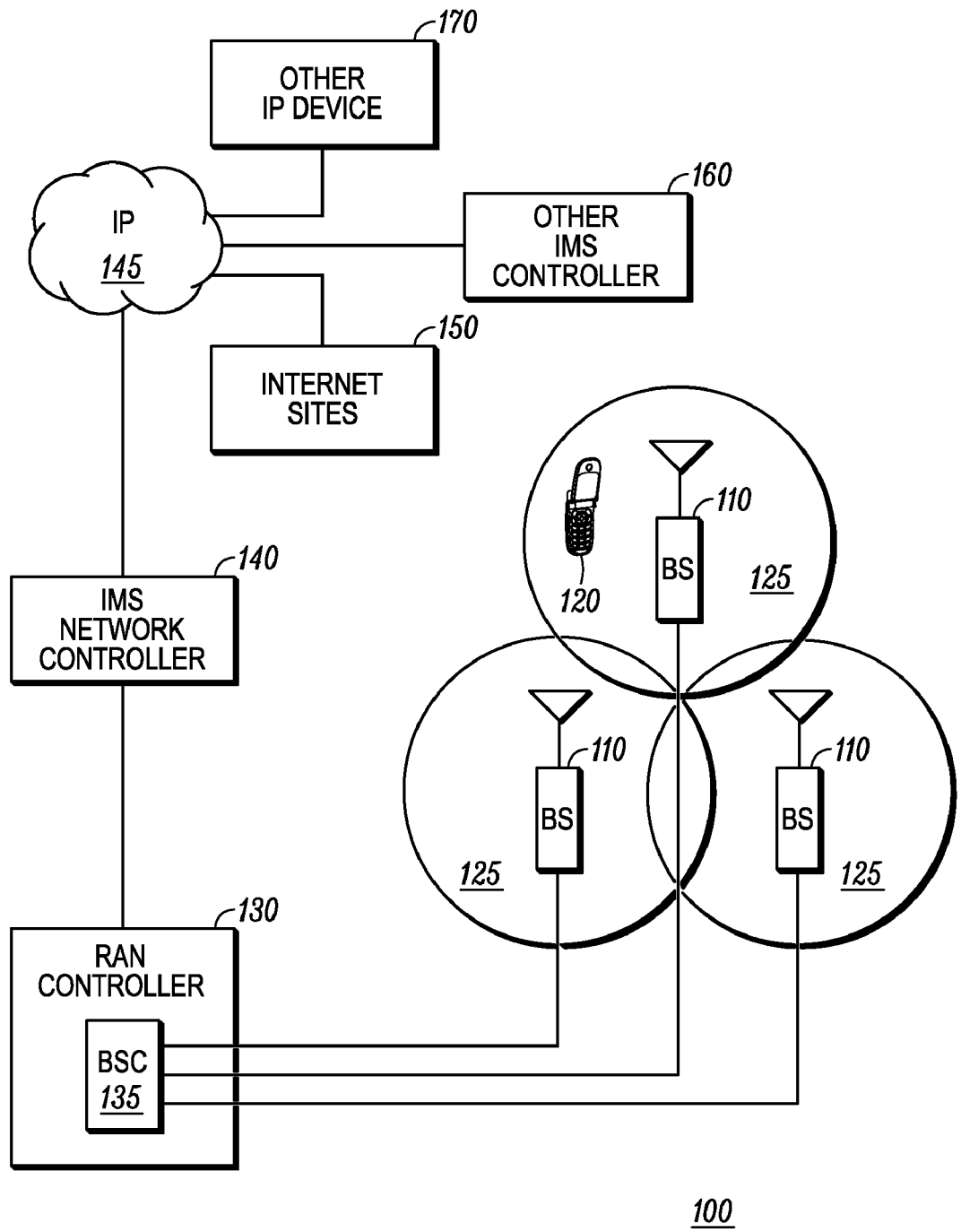
FIG. 1 is a block diagram of a wireless communication system in accordance with an embodiment of the present invention.

A method for receiving up-to-date transportation information at a user entity in an internet protocol (IP) multimedia subsystem (IMS) wireless communication system includes requesting up-to-date transportation information, determining which up-to-date transportation information is desired, requesting access to the desired up-to-date transportation information, obtaining the desired up-to-date transportation information, and providing the desired up-to-date transportation information to the user entity for presentation to the user.

An internet protocol (IP) multimedia subsystem (IMS) wireless communication system provides communication for one or more wireless communication devices. The wireless communication devices include an antenna for receiving and transmitting radio frequency (RF) signals for wireless communication in the IMS wireless communication system, receiver circuitry for demodulating and decoding the RF signals, and transmitter circuitry for encoding and modulating information to provide modulated signals to the antenna for transmission as RF signals. The wireless communication devices also include user input keys for detecting a user entity input requesting up-to-date transportation information and a user entity controller for determining which up-to-date transportation information is desired in response to the user entity input and generating IMS request information requesting access to the desired up-to-date transportation information. The request information is provided to the transmitter circuitry for encoding and modulating for transmitting RF signals which include the IMS request information. TMS wireless communication system also includes a plurality of network base stations for receiving, demodulating and decoding RF signals from the wireless communication devices to recover the IMS request information, a radio access network controller coupled to the network base stations for receiving the IMS request information, and an internet protocol (IP)

multimedia subsystem (IMS) network controller coupled to the radio access network controller for receiving the IMS request information and determining the desired up-to-date information. The IMS network controller then obtains the desired up-to-date transportation information and provides it to the user entity for presentation to the user.

In addition, a method for call setup in a location based push to talk (PTT) over Cellular (PoC) communication system having a PoC server includes detecting a PTT input at a user entity requesting up-to-date transportation information, determining which up-to-date transportation information is desired, requesting access to the desired up-to-date transportation information, and providing the desired up-to-date transportation information to the user entity for presentation to the user.

The following detailed description of the invention is merely exemplary in nature and is not intended to limit the invention or the application and uses of the invention. Furthermore, there is no intention to be bound by any theory presented in the preceding background of the invention or the following detailed description of the invention.

Referring to FIG. 1, a wireless communication system 100 in accordance with an embodiment of the present invention includes a plurality of base stations 110 and a wireless communication device 120. The plurality of base stations 100 communicate with the wireless communication device 120 via radio frequency (RF) signals. Associated with each of the plurality of base stations 110 is a coverage area or cell 125 wherein the wireless communication device 120 can receive signals from and transmit signals to such one of the plurality of base stations 110.

The plurality of base stations 110 are coupled to a radio access network controller 130 for control of communications in the wireless communication system 100. In particular, the plurality of base stations 110 are coupled to a base station controller 135 of the radio access network controller 130 which controls signaling with each of the plurality of base stations 110. The radio access network controller 130 can access the base station controller 135 to determine which cell 125 of the wireless communication system 100 a wireless communication device 120 is located in by determining which one of the plurality of base stations 110 is receiving RF signals from the wireless communication device.

The radio access network controller 130 is coupled to an internet protocol (IP) multimedia subsystem (IMS) network controller 140. The IMS network controller 140 is an internet server for control of IMS communications between the radio access network and the internet 145. For example, the wireless communication device 120 could access an internet site 150 through the IMS network controller 140. In addition, the IMS controller 140 could establish and maintain communications with another IMS communication system by coupling to another IMS controller 160 or could couple to any of a number of other IP devices 170 for establishing and maintaining an IMS communication session.

Figure 2:
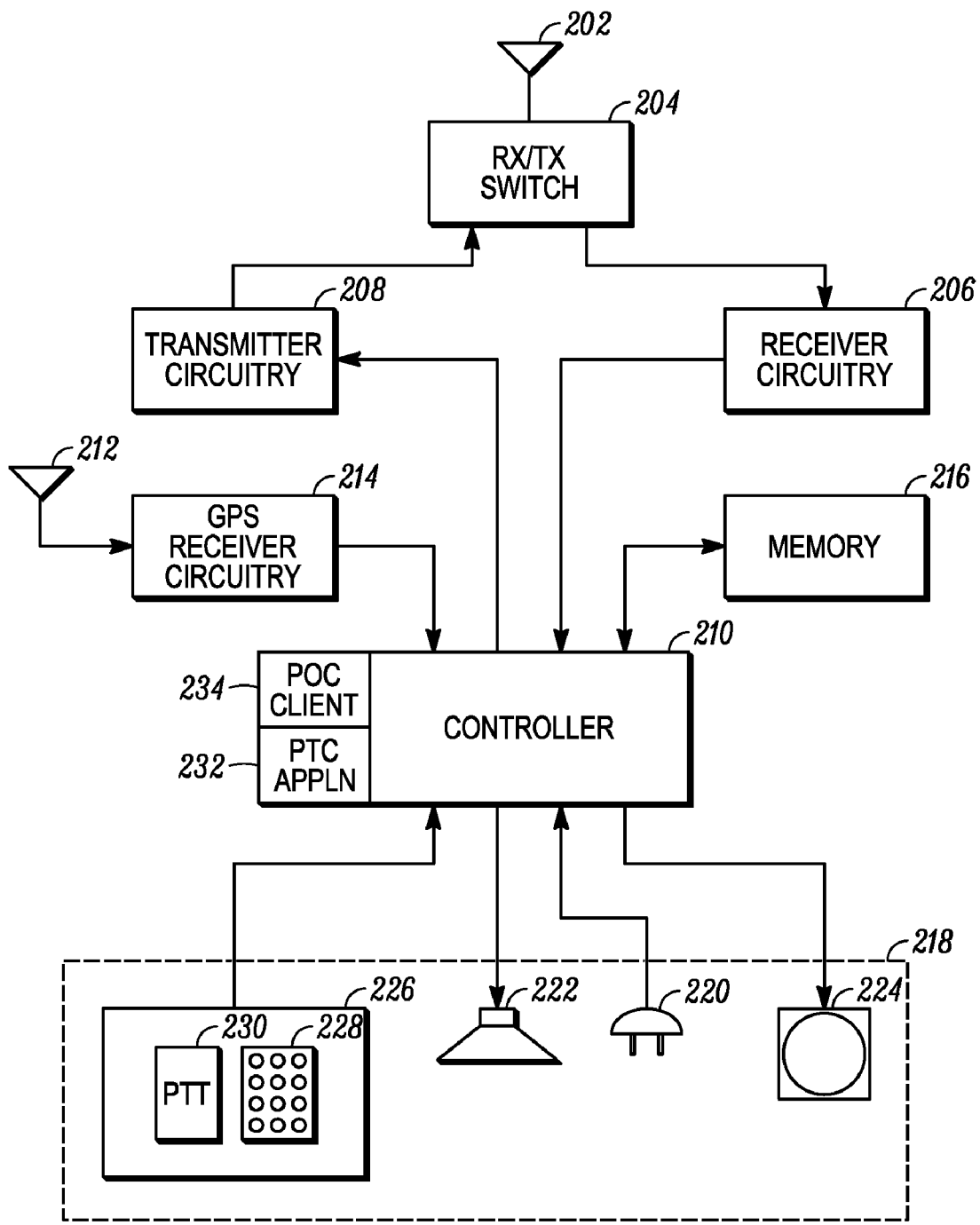
FIG. 2 is a block diagram of a wireless communication device of the communication system of FIG. 1 in accordance with the embodiment of the present invention.

Referring to FIG. 2, a wireless communication device 120 in accordance with the embodiment of the present invention is shown. The wireless communication device 120 includes an antenna 202 for receiving and transmitting radio frequency (RF) signals. A receive/transmit switch 204 selectively couples the antenna 202 to first receiver circuitry 206 and transmitter circuitry 208 in a manner familiar to those skilled in the art. The first receiver circuitry 206 demodulates and decodes the RF signals received from the base stations 110 (FIG. 1) to derive information therefrom and is coupled to a controller 210 for providing the decoded information thereto for utilization thereby in accordance with the function(s) of the wireless communication device 120. The controller 210 also provides information to the transmitter circuitry 208 for encoding and modulating information into RF signals for transmission from the antenna 202.

A second antenna 212 is coupled to second receiver circuitry 214 for receiving, demodulating and decoding Global Positioning System (GPS) signals received from satellites of a GPS system to extract location information therefrom indicating the location of the wireless communication device 120. As is well-known in the art, the controller 210 is typically coupled to a memory device 216 and a user interface 218 to perform the functions of the wireless communication device 120.

The user interface 218 includes a microphone 220, a speaker 222 and a display 224 which may be designed to accept touch screen inputs. The user interface 218 also includes one or more key inputs 226, including a keypad 228 and a push-to-talk (PTT) key or button 230. The PTT button 230 is given a form factor, such as designed taller than the other key inputs 226, so that a user can easily access the PTT button 230. As to functionality, the PTT button 230 provides the user a single keypress to initiate a predetermined application or function of the wireless communication device 120. In accordance with the present invention, a Push-to-Commute (PTC) application 232, stored in the controller 210, operates under the control of the PTT button 230.

The wireless communication device 120 can communicate with other wireless communication devices 120 in the radio access network managed by the radio access network controller 130. In addition, the wireless communication device 120 is an IMS-enabled wireless communication device 120 and can participate in multimedia IP communication sessions, such as IMS communication sessions, via the IMS network controller 140 (FIG. 1). One such IMS communication session is a PTT over cellular (PoC) communication session. The wireless communication device 120 can initiate or join PoC communication sessions through activation of a PoC client application 234 in the controller 210.

Figure 3:
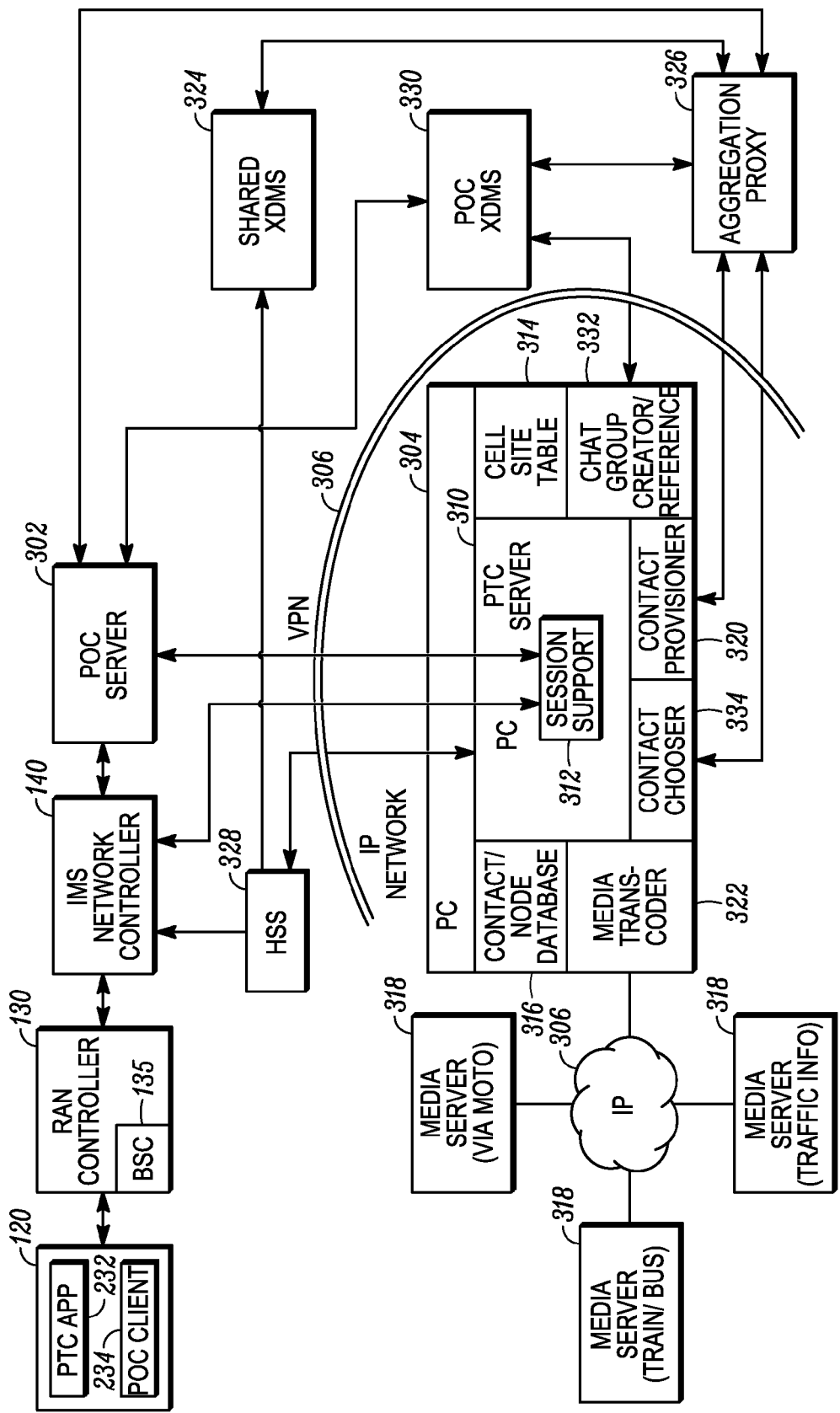
FIG. 3 is a diagram of the Push to Commute (PTC) system incorporating the communication system of FIG. 1 and the wireless communication device of FIG. 2 in accordance with the embodiment of the present invention.

Referring next to FIG. 3, a push to commute (PTC) system 300 in accordance with an embodiment of the present invention permits a user of an IMS-enabled wireless communication device 120, such as a cellular telephone, to timely access commute-related up-to-date transportation information with use of the PTT button 226. In essence, the PTC system 300 functions as an up-to-date transportation notification system, advising the user of present traffic conditions (e.g., road conditions, traffic density) on his commute route or commuting schedules of public transportation (e.g. bus schedules, train schedules, bus or train delays).

PoC communications allow a user to initiate or join PoC communication sessions in accordance with PoC standards formulated by the Open Mobile Alliance (OMA) for internet protocol (IP) communication sessions. The PTC system 300 is a PoC-based system, utilizing the pre-defined features and characteristics of PoC communications and providing a PoC server 302 coupled to the IMS network controller 140 for managing the PoC communications.

In accordance with the present invention, a personal computer (PC) 304 is coupled to the PoC server 302 and the IMS network controller 140 across an IP network 306 by a virtual private network (VPN) connection 308. The VPN connection 308 is a secure connection provided across the IP network 306 to allow the PC 304 to communicate with the IMS network controller 140 and the PoC server 302 to establish, join or maintain PTC communication sessions. In addition to conventional PC functions, the PC 304 includes PTC-specific applications to function as a PTC server 310 by, for example, providing session support 312 for the PTC communication sessions. In addition, the PC 304 maintains a cell site table 314 for the cells/base stations 110 of the wireless communication system 100 for defining a geographic location in response to receiving cell site identification information identifying a cell 110 that is receiving and transmitting signals to the wireless communication device 120.

The PC 304 also maintains a contact/node database 316 having one or more contacts stored therein along with a plurality of nodes for each contact. In accordance with the present invention, a contact is data identifying location informative media accessible at one of a plurality of media servers 318 accessible through the IP network 306. For example, a contact could identify video media (up-to-date photos or video feed) from a highway camera that is accessed over the IP network 306 by a server 318, such as a public highway department website server. Also, a contact could identify information such as bus or train schedules and up-to-date delays or schedule changes that is provided over the IP network 306 by a server 318, such as a public transportation company's website server. In addition, a contact could identify information such as location specific traffic information that can be accessed over the IP network 306 by a server 318 such as a ViaMoto server.

Prior to a contact being stored in the contact/node database 316, the contact is provisioned by a contact provisioner 320 which creates the plurality of nodes for the contact. In accordance with the embodiment of the present invention, the plurality of nodes would include a name for the contact, a uniform resource identifier (URI) assigned to a uniform resource locator (URL) of the location informative media, a contact type, a media type, a URI of the PTC server 310, and a method for transcoding the location informative media when it is accessed by the PTC server 310. The plurality of nodes are stored with a contact in XML format as XML data management information for the contact.

Transcoding the media refers to the process of changing the coding of the media received from a media server 318 to a coding by the wireless communication device 120 in a PTC communication system. For example, transcoding could include scaling the media, converting the codec of the media (such as converting BMP visual media to JPG visual media), or changing the extension name of the media (such as changing the extension from jpeg to jpg). When accessing a contact, a media transcoder 322 transcodes the location informative media of the contact in accordance with a method of transcoding stored as one of the nodes of the contact. The present invention supports distributed computed transcoding by providing the media transcoder 322 in the PC 304 instead of centrally supplied, such as in the PoC server 302. The media is thus advantageously transcoded by the media transcoder 322 before being provided to the PTC server 310, providing more efficient and speedy processing of the media to provide it in a timely manner to the wireless communication device 120.

The contact provisioner 320 is coupled to a shared XML data management server (shared XDMS) 324 via an aggregation proxy 326. When a contact is going to be added to the contact/node database 316, the contact provisioner 320 contacts the aggregation proxy 326 which authenticates the information from the contact provisioner and determines if the shared XDMS 324 is the intended server for the new contact information. If the XDMS 324 is the intended recipient, the XDMS 324 verifies whether the contact is a new contact. New contacts are stored in a subscription database in a home subscriber server (HSS) 328, the HSS 328 coupled to the IMS network controller 140 and the PoC server 302 for IMS operation and for, in accordance with the present invention, maintaining the subscription database to enable PTC communication sessions with contacts stored therein. In addition to provisioning contacts, when contacts are chose by a contact chooser 334, a message is sent to the aggregation server 326 for authentication and forwarding to the appropriate XDMS, in this case a PoC XML data management server (PoC XDMS) 330.

The PoC XML data management server (PoC XDMS) 330 is coupled to the PoC server 302 and maintains PoC policies and functionality for the establishment and maintenance of communications in the PoC/IMS system in accordance with OMA standards. In addition, in accordance with the embodiment of the present invention, a chat group creator/reference 332 communicates with the PoC XDMS 330 via the aggregation proxy 326 to create and maintain a database of chat groups and group call information at the PoC XDMS 330 for establishing location-based chat-groups to allow commuters to exchange current information on traffic conditions or public transportation schedules. Participation in location-based chat groups is referred to as operation of the PTC system in the CB radio mode.

Thus it can be seen that the embodiment of the present invention provides a system for PTC communications where a user of a PTC-enabled wireless communication device 120 can receive up-to-date transportation information and notification of commute conditions information through accessing location informative media at a plurality of contacts or joining location-based chat groups. Hereinafter, functioning of the PTC system 300 will be described in reference to flow diagrams showing various operations of the PTC system 300 in accordance with the embodiment of the present invention.

Figure 4:
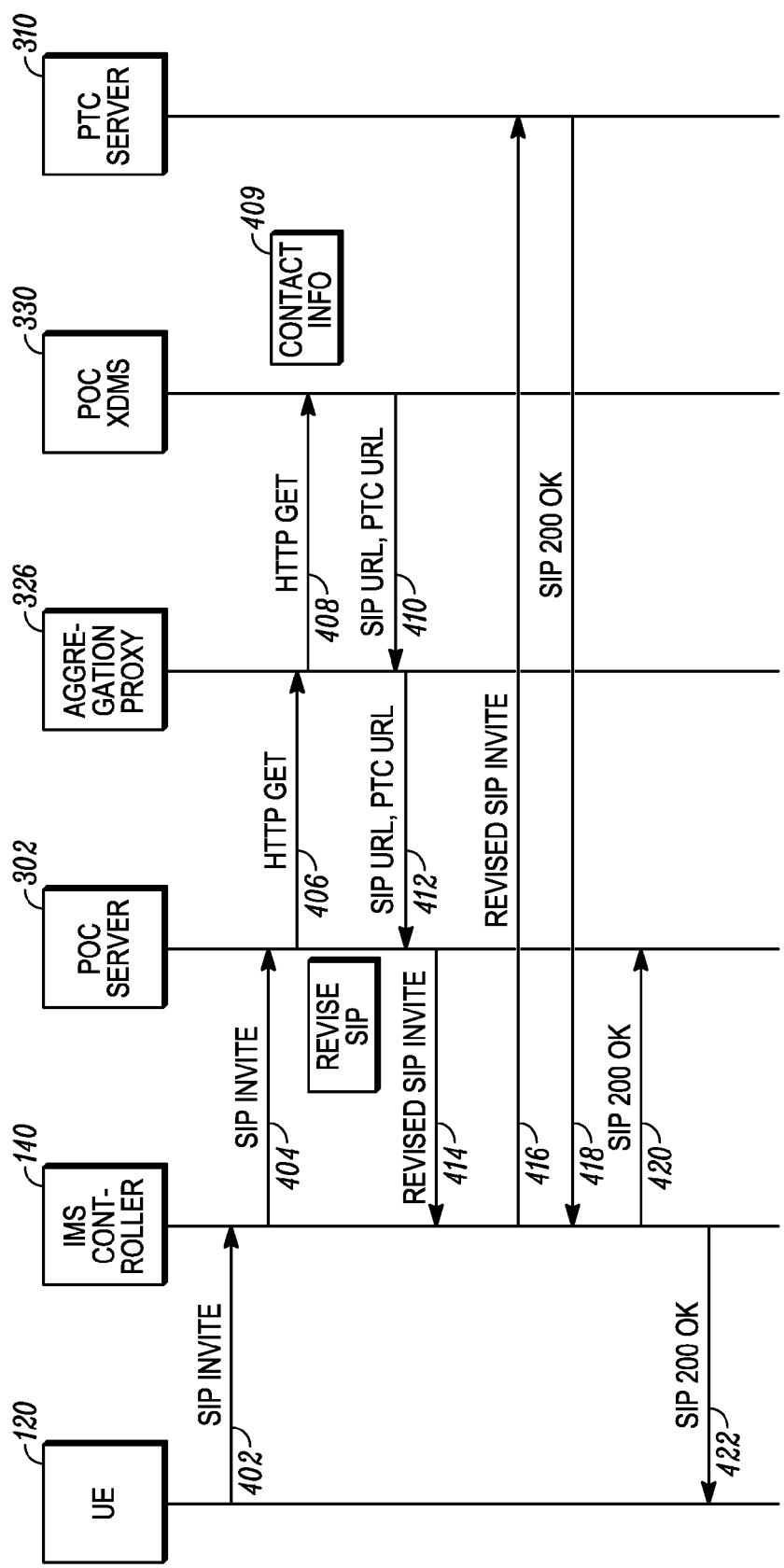
FIG. 4 is a flow diagram of a PTC communications session setup operation of the PTC system of FIG. 3 in accordance with the embodiment of the present invention.

Referring to FIG. 4, a flow diagram for setting up a PTC communications session is shown. The user entity (the wireless communication device 120) initiates the call by forwarding a session initiation protocol (SIP) invitation (SIP INVITE) 402 from the PTC application 232 of the user entity 120 to the IMS controller 140. The call is initiated by the controller 210 in response to detecting a predefined PoC user input via the PTT button 230 requesting up-to-date transportation information. The SIP INVITE includes the URI of the contact being invited. The contact being invited is a location type contact selected from the PTC contact list stored in the memory 216 in response to the location of the user entity 120, where the PTC contact list could include one or more predefined contacts along a commute route of user of the wireless communication device 120. The location of the user entity could be determined by the GPS receiver circuitry 214 or by identification of a cell or base station 110 which is communicating with the wireless communication device 120 (i.e., the wireless communication device 120 is located in the coverage area 125 associated with the identified cell 110). Within the SIP INVITE message, information is included identifying the support for the media type associated with the location contact.

The IMS Controller 140 recognizes the SIP INVITE as a PoC Invitation and, after adding identification information identifying the IMS controller 140 to the SIP INVITE as a routing header to be used in establishing the PoC communication session, forwards it 404 to the PoC server 302 in accordance with OMA PoC standards. The PoC server 302 sends the HTTP GET 406 to the aggregation proxy 326 to determine to which XDMS 324, 330 receipt is intended and, as the HTTP GET is intended to be received by the PoC XDMS 330, the aggregation proxy forwards the HTTP GET 408 to the PoC XDMS 330 which checks the invited contact to determine if it is a location type contact. The PoC XDMS server 330 then retrieves the contact information, including the location server field if the contact is a location type and the location server URI of the contact 409. The contact information is forwarded 410 to the aggregation proxy 326 which provides it 412 to the PoC server 302 for performing conventional checks required by the OMA PoC standards, such as assuring the contact has not exceeded it's maximum number of sessions as determined by the policy document associated with it. The PoC server 302 then adds the location server URI (PTC URI) from the contact information to a route header in the SIP INVITE to generate a revised SIP INVITE 413.

The revised SIP INVITE is next forwarded 414 to the IMS controller 140. In accordance with the present invention, the revised SIP INVITE is sent 416 to the PTC server 310 using the route header supplied by the IMS controller 140. The PTC server 310 associates the contact with the contact/node database 316 and accepts a session on behalf of the contact if the contact exists in the database 316. The PTC server 310 then sends a SIP 200 OK with a session ID 418 back to the IMS controller 140 which forwards the 200 OK 420 to the PoC server 302 and transmits the 200 OK 422 to the PTC Client to complete the call setup.

Figure 5:
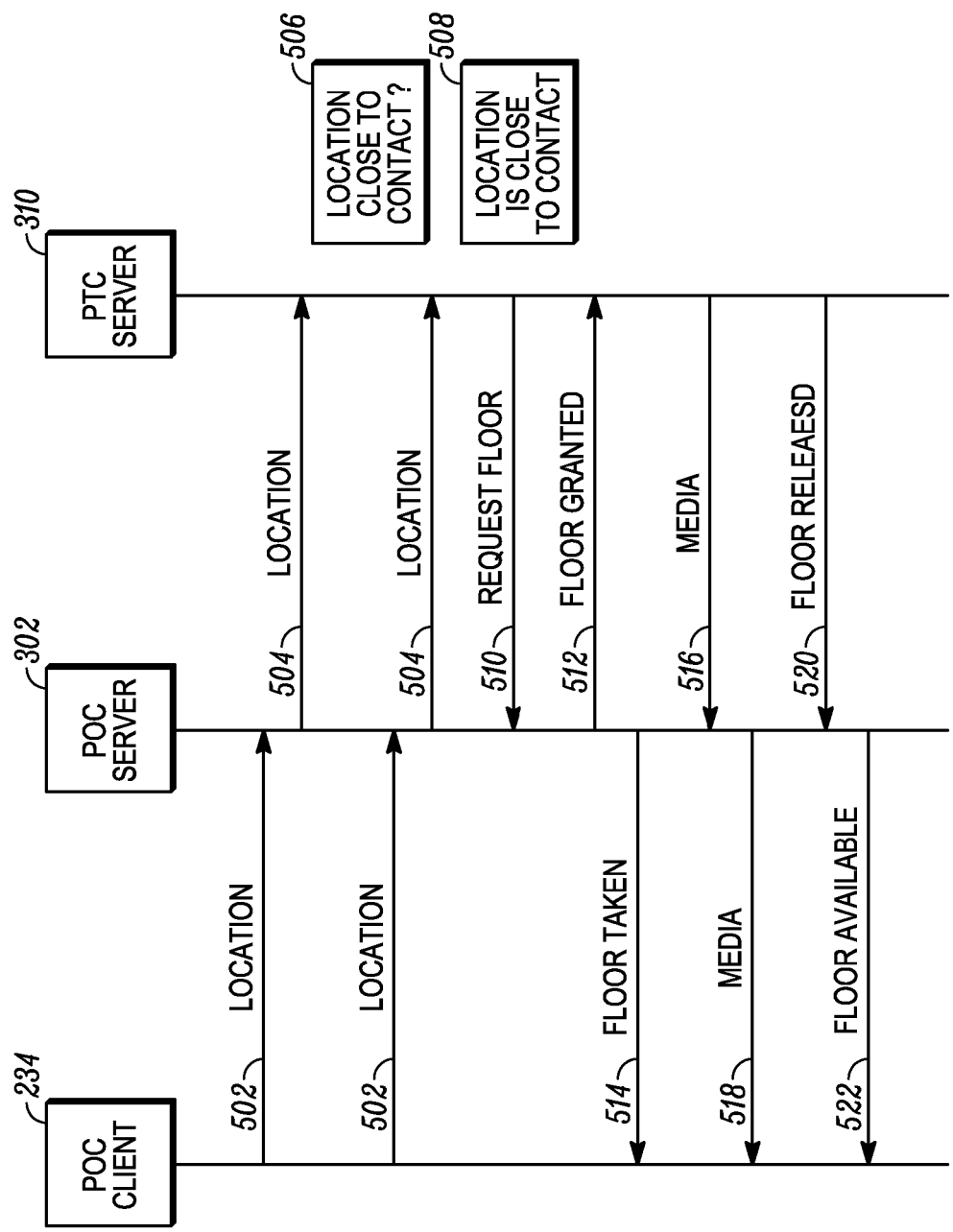
FIG. 5 is a flow diagram of an up-to-date transportation notification operation following the commuting route of a user in the PTC system of FIG. 3 in accordance with the embodiment of the present invention.

Referring to FIG. 5, a PTC communication session following a commuting route of a user begins with the PoC client 234 of the wireless communication device 120 detecting a user input from the PTT button 230 requesting a PTC communication session (i.e., requesting media form a PTC contact) and sending location information 502 to the PoC server 302. The location of the wireless communication device 120 can be determined by signals from the GPS receiver 214. Alternatively, the location of the wireless communication device 120 can be determined by closest cell ID data of the closest base station 110 as determined by using the cell site table 314. If the user input indicates a media type of the PTC information to be retrieved and presented, either explicitly or implicitly in response to the contact identified, the controller 210 will verify that the wireless communication device can support the media type being requested.

The PoC server 302 forwards the location information 504 to the PTC server 310 (using, for example, a new RTCP type packet) so that the PTC Server 310 can monitor the location of the PTC Client. The PTC server 310 checks the location information against the location information of each location contact in the contact/node database 316 to determine if the wireless communication device is close to any location based contacts 506.

When the PTC server 310 identifies a contact in the contact/node database 316 close to the wireless communication device's 120 location 508, the PTC Server 310 forwards a session ID and a request for the floor to the PoC server 302 for a multimedia PoC communication session 510 to allow a virtual contact to take the floor (i.e., a communication session between a location based contact and the PoC client 234 under the control of the PoC server 302).

The PTC server 310 collects media from media server 318. The media may have been previously collected and store (if media data is collected on regular basis or upon events associated with the media server). The PTC server 310 transcodes the media and prepares to send it. The virtual contact automatically takes the floor of the PoC communication session (following OMA PoC standards regarding RTCP floor control), the floor is granted 512 by the PoC server, the PoC client 234 is informed that the floor is taken 514 and the PTC server sends the collected media (via RTP protocol) 516. In accordance with the embodiment of the present invention, the RTP packet will have support for a plurality of media types, including media types not currently defined in OMA PoC standards such as JPG images, as well as text, audio and streaming video. The PTC Client 234 will render the media once it is received 518 for presentation via the user interface devices 218 to the user of the wireless communication device 120. The PoC client 234 then sends an acknowledgement back to the PTC Server 310 for media types that require acknowledgements (e.g., PTV images). The PTC server 310, upon receipt of the acknowledgement, if required, or immediately after sending the media, if acknowledgement is not needed, will end the session automatically, sending a SIP BYE to release the floor 520 and the PoC server 302 notifies the PoC client that the floor is available 522.

Figure 6:
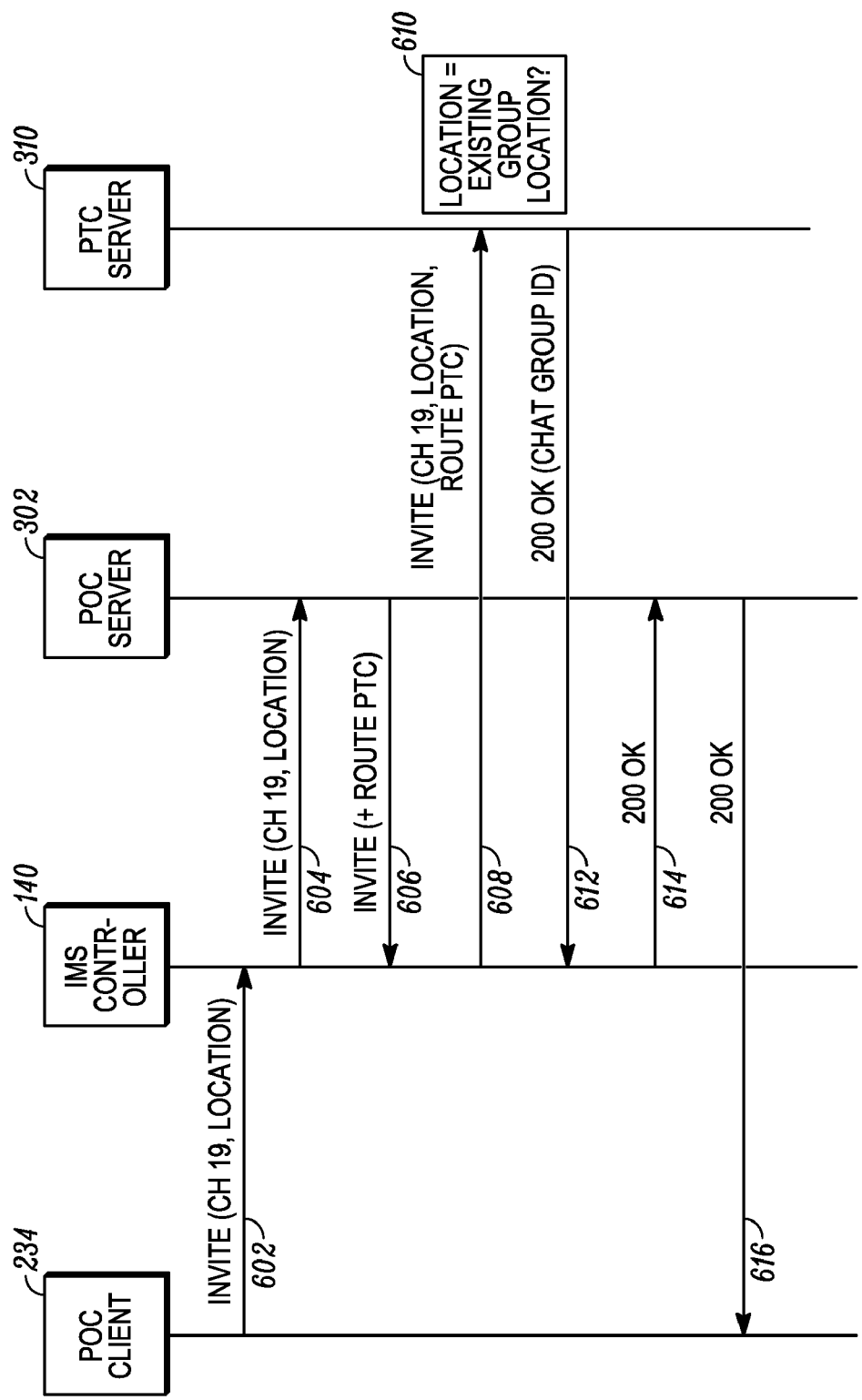
FIG. 6 is a flow diagram for a call setup operation for a location based chat group call in the PTC system of FIG. 3 in accordance with the embodiment of the present invention where there is an existing chat group call.

Referring to FIG. 6, the call setup procedure for a location based chat group call where the PoC communication session already exists, is shown. In response to a location of the wireless communication device 120, the PoC client therein transmits 602 a location based CH19 INVITE to the IMS controller 140, the CH19 INVITE being a location based invitation for establishment of a group call which includes location information identifying the location of the wireless communication device 120. The IMS controller 140 provides 604 the CH19 INVITE to the PoC Server 302. The PoC server 302 adds a route header to the CH19 INVITE and forwards it 606 to the IMS controller 140 for providing 608 to the PTC server 310. The PTC server 310 compares the location identified by the location information to locations of existing chat groups 610 stored in the chat group reference 332.

When an existing chat group is identified, a 200 OK (RTP protocol) response is sent 612 to the IMS controller 140 for providing 614 to the PoC server 302. The 200 OK response includes chat group identification information identifying the existing location based chat group. The PoC server 302 appends a group name to the 200 OK response and forwards it 616 to the PoC client 234. The PoC client 234 then offers the user the opportunity to enter the chat group identified by a predetermined keypress of the PTT button 230 by providing an audio and or a visual notification of the an existing chat group at the user's location via the user interface devices 218.

Figure 7:
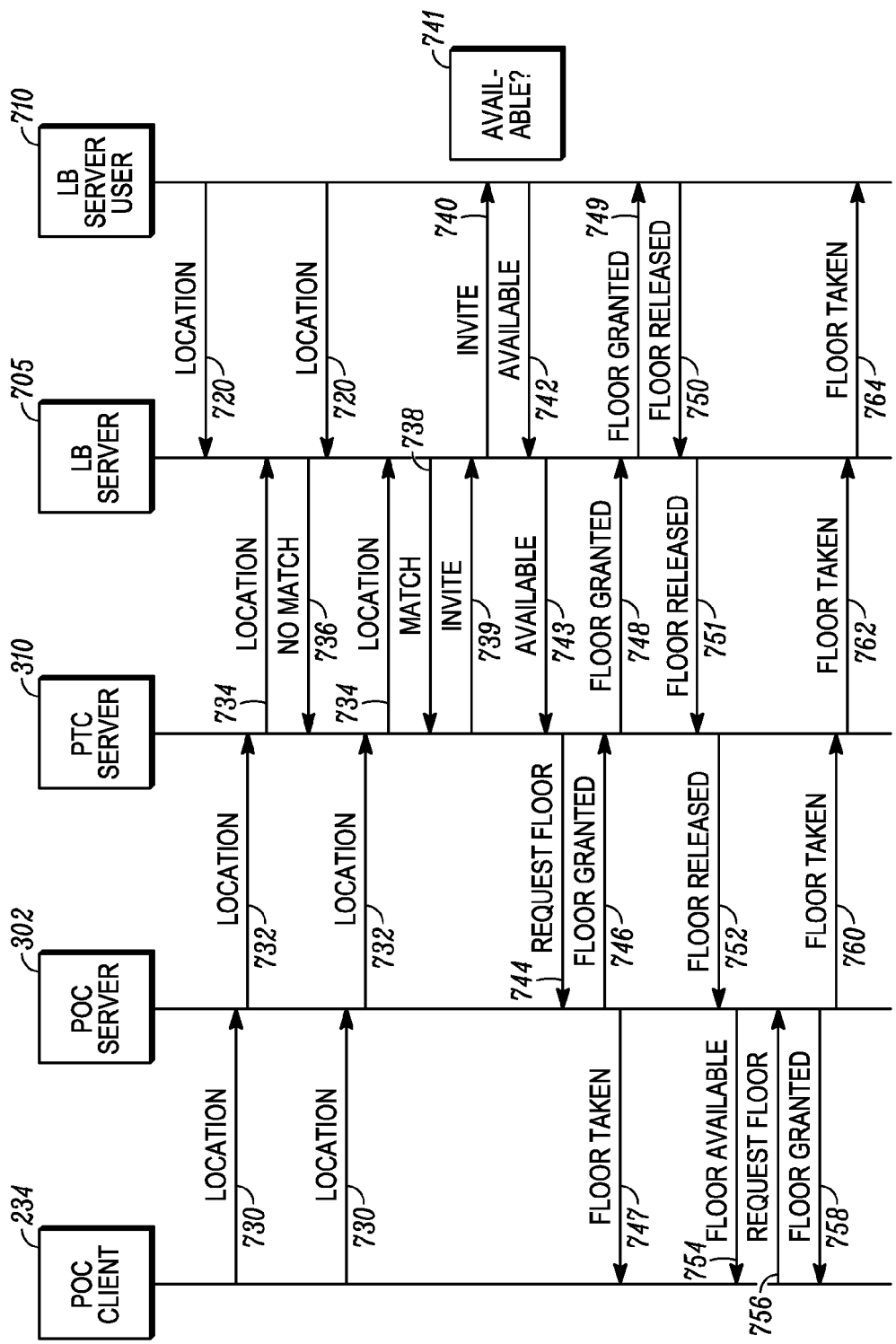
FIG. 7 is a flow diagram for a call setup operation for a location based chat group call in the PTC system of FIG. 3 in accordance with the embodiment of the present invention where there is not an existing chat group call.

Referring to FIG. 7, the process for setting up a location based chat group call where none currently exists refers to the operation of the PoC client 234, the PoC server 302 and the PTC server 310. In addition, the operation of a location based (LB) server 705 and a wireless communication device (LB server user) 710 communicating with the LB server 705 are shown.

Periodically, the LB server user 710 sends his location 720 to the LB server 705. In addition, periodically the PoC client 234 transmits 730 the location of the wireless communication device 120 to the PoC server 302 for sending on 732 to the PTC server 310. The PTC server is in communication with the LB server 705 and, in response to reception of the location information from the PoC client 234, sends a query 734 to the LB server 705 to determine if any user associated with the LB server 705 (e.g., LB server user 710) is at a location matching the location received from the PoC client 234. When the LB server responds NO 736, the matter is dropped. When the LB server responds YES 738, the PTC server sends an INVITE 739 to the LB server 705 inviting the LB server user 710 to a location based chat group call. The LB server 705 forwards the INVITE 740 to the LB server user 710.

The LB server then determines whether it is available 741. For example, an audio or visual alert could be provided to the LB server user 710 informing the user of the invitation to the chat group call. A positive response by the user via a user input would indicate availability. A negative response, or no response, would indicate that the user did not want to be available (i.e., did not want to join) the chat group call. In addition, in accordance with the embodiment of the present invention, the user could transmit a 'do not disturb' (DND) signal to the LB server 705 indicating that the user 710 does not want to participate in any chat group calls. The LB server sets a DND flag so that no invitation to a chat group call is accepted.

When the LB server user 710 indicates availability 742 to the LB server 705, the LB server 705 notifies the PTC server 310 that the user at the identified location is available 743. The PTC server then requests the floor from the PoC server 302 in accordance with RTP protocol 744 for a PoC communication session that is a location based chat group call. As the PTC server had requested the floor 744 as a proxy for the LB server user 710, when a floor granted response is received 746 from the PoC server 302, a floor taken message is provided to the PoC client 234. The floor granted response is provided 748 to the LB server 705 for transmission 749 to the LB server user 710. Similar to ham radio or CB radio communication, when the device has the floor, the user can talk and be heard by all participants in the chat group call. After the user 710 is finished talking (e.g., reporting traffic conditions at his location), he releases the floor 750 and the LB server forwards the floor release message 751 to the PTC server 310 which forwards the floor release 752 to the PoC server 302. In this manner the chat group call is controlled by the PoC server 302 associated with the wireless communication device 120 that initiated the chat group call. The PoC client 234, in response to the PoC server receiving the floor release 752 is notified that the floor is available 754. If the user of the PoC client 234 wishes to talk, he sends a floor request 756 to the PoC server 302. The PoC server sends a floor granted to the PoC client 234 and a floor taken 760 to the PTC server for providing 762 to the LB server 705 and thence 764 to the LB server user 710.

Alternatively, instead of relying upon LB server 710 to identify a chat group participant based upon location, the PTC server 310 or the wireless communication device 120 could store a list of predefined participants sharing similar commutes (bus or train transportation or highway commute routes) which could be invited to a chat group in accordance with FIG. 7.

Thus it can be seen that an up-to-date transportation notification system has been provided which advantageously keeps a commuter apprised of current traffic conditions or public transportation conditions based on the location of the commuter.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. A method for receiving up-to-date transportation information at a user entity in an internet protocol (IP) multimedia subsystem (IMS) wireless communication system, the method comprising the steps of:

detecting a user entity input;

requesting up-to-date transportation information in response to detecting the user entity input;

determining a location of the user entity;

determining which up-to-date transportation information is desired in response to the location of the user entity, the user entity input and location group information, wherein the location group information is one or more predefined contacts associated with one or more predefined locations of a user entity commute route;

requesting access to the desired up-to-date transportation information;

obtaining the desired up-to-date transportation information; and providing the desired up-to-date transportation information to the user entity for presentation to the user therefrom, wherein the desired up-to-date transportation information comprises up-to-date video information, and wherein the step of detecting a user entity input comprises the step of receiving a predefined Push to Video (PTV) input from a PTT input button requesting the up-to-date video information, and wherein the step of providing the desired up-to-date transportation information to the user entity comprises the step of transmitting streaming video information to the user entity for presentation of the streaming video information as the up-to-date video information to the user.

2. A method for receiving up-to-date transportation information at a user entity in an internet protocol (IP) multimedia subsystem (IMS) wireless communication system, the method comprising the steps of:

requesting up-to-date transportation information;

determining a uniform resource identifier (URI) associated with desired up-to-date transportation information, wherein the URI includes contact information;

sending a session initiation protocol (SIP) invitation to the IMS network controller, the SIP invitation including the URI associated with the desired up-to-date transportation information and support information, the support information indicating capabilities of the user entity to support a media type associated with the contact information;

providing a push to talk (PTT) over Cellular (PoC) invitation to a PoC server, the PoC invitation comprising the SIP invitation;

retrieving one or more contacts, the one or more contacts determined in response to the contact information and a list of stored contacts for which the up-to-date transportation information is desired;

accessing internet sites corresponding to the one or more contacts, the internet sites having transportation information associated therewith, wherein the step of accessing the internet sites comprises the steps of:

the PoC server providing a location contact to a data management server;

the data management server providing a revised SIP to a internet access management server, the revised SIP including a location server URI in response to determining that the contact information identifies a location contact, a location server URI associated with the location contact defined by the contact information; and the internet access management server initiating an internet session with the location contact if the location contact is an internet address contact in a contact database stored at the internet access management server; and receiving session identification information from the internet access management server identifying the internet session initiated thereby; and providing the desired up-to-date transportation information to the user entity for presentation to the user therefrom, wherein the step of providing the desired up-to-date transportation information to the user entity comprises the step of joining to the internet session in response to receiving the session identification information.

3. A method for call setup in a location based push to talk (PTT) over Cellular (PoC) communication system comprising a PoC server and a push-to-commute management server coupled to the PoC server, the method comprising the steps of:

detecting a PTT input at a user entity requesting up-to-date transportation information;

determining which up-to-date transportation information is desired by generating a set of user entities in response to the location of the user entity and a list of registered user entities stored at the push-to-commute management server;

requesting access to the desired up-to-date transportation information; and providing the desired up-to-date transportation information to the user entity for presentation to the user therefrom.

4. The method of claim 3 wherein the step of generating a set of user entities comprises the step of generating a set of user entities in response to the location of the user entity, a list of registered user entities stored at the push-to-commute management server, and registered user entity do-not-disturb information corresponding to each of the registered user entities.

5. A method for call setup in a location based push to talk (PTT) over Cellular (PoC) communication system comprising a PoC server, the method comprising the steps of:

detecting a PTT input at a user entity requesting up-to-date transportation information;

determining which up-to-date transportation information is desired in response to a location of the user entity;

requesting access to the desired up-to-date transportation information; and providing the desired up-to-date transportation information to the user entity for presentation to the user therefrom, wherein the step of providing the desired up-to-date transportation information to the user entity for presentation to the user therefrom comprises the step of providing the user with internet session options for defining the user entity participation in an internet session, the internet session options including the user entity taking the floor in the internet session, the user entity not having the floor in the internet session or the user not participating in the internet session while searching for another internet session.

6. The method of claim 5 wherein the PoC communication system includes a push-to-commute management server coupled to the PoC server, and wherein the internet session options further include the user entity permitting the push-to-commute management server to allow a location based contact to have the floor in the internet session.

7. An internet protocol (IP) multimedia subsystem (IMS) wireless communication system comprising:

one or more wireless communication devices comprising:

a first antenna for receiving and transmitting radio frequency (RF) signals for wireless communication in the IMS wireless communication system;

first receiver circuitry coupled to the first antenna for demodulating and decoding the RF signals;

transmitter circuitry for encoding and modulating information to provide modulated signals to the first antenna for transmission therefrom as RF signals;

user input keys for detecting a user entity input requesting up-to-date transportation information; and a user entity controller coupled to user input keys and the transmitter circuitry for determining which up-to-date transportation information is desired in response to the user entity input, the controller generating IMS request information requesting access to the desired up-to-date transportation information and providing the request information to the transmitter circuitry for encoding and modulating thereby; and a plurality of network base stations for receiving, demodulating and decoding RF signals from the one or more wireless communication devices to recover the IMS request information therefrom;

a radio access network controller coupled to the plurality of network base stations for receiving the IMS request information therefrom; and an internet protocol (IP) multimedia subsystem (IMS) network controller coupled to the radio access network controller for receiving the IMS request information and determining the desired up-to-date information therefrom, the IMS network controller obtaining the desired up-to-date transportation information and providing the desired up-to-date transportation information to the user entity for presentation to the user therefrom.

8. The IMS wireless communication system of claim 7 wherein the user input keys include a push to talk (PTT) input button, and wherein the user entity controller determines that the predefined input is a PTT over Cellular (PoC) input requesting up-to-date transportation information in response to a predefined input signal from the PTT input button.

9. The IMS wireless communication system of claim 7 wherein the one or more wireless communication devices further comprise:

a second antenna for receiving global positioning system (GPS) RF signals; and second receiver circuitry coupled to the second antenna for receiving and demodulating the GPS RF signals to generate GPS information, the second receiver circuitry coupled to the user entity controller for providing the GPS information thereto, and wherein the user entity controller determines a location of the user entity in response to the user entity input and the GPS information, and wherein the controller determines which up-to-date transportation information is desired in response to the location of the user entity.

10. The IMS wireless communication system of claim 7 wherein the controller determines which one of the plurality of network base stations wherefrom the user entity is receiving RF signals when detecting the user entity input, the user entity controller further determining which up-to-date transportation information is desired in response to a location of the one of the plurality of network base stations.

11. The IMS wireless communication system of claim 7 wherein the user entity controller determines a location of the user entity and, in response to the location of the user entity, the user entity input and location group information, determines which up-to-date transportation information is desired, wherein the location group information is one or more predefined contacts associated with one or more predefined locations of a user entity commute route.

12. The IMS wireless communication system of claim 7 wherein the user entity controller further determines a uniform resource identifier (URI) associated with the desired up-to-date transportation information, the URI including contact information, and wherein the request information provided to the IMS Server comprises a session initiation protocol (SIP) invitation, the SIP invitation including the URI associated with the desired up-to-date transportation information and support information, the support information indicating capabilities of the user entity to support a media type associated with the contact information, the IMS wireless communication system further comprising:
a push to talk (PTT) over Cellular (PoC) server coupled to the IMS network controller for receiving a PoC invitation comprising the SIP invitation;
a data management server coupled to the PoC server for receiving the PoC invitation therefrom and for generating a revised SIP, the revised SIP including a location server URI, in response to determining that the contact information identifies a location contact, the location server URI associated with the location contact defined by the contact information; and
a Push to Commute (PTC) server coupled to the data management server for receiving the revised SIP therefrom and comprising a contact memory, the Push to Commute (PTC) server retrieving one or more contacts having URI information associated therewith, the one or more contacts determined in response to which up-to-date transportation information is desired and a list of stored contacts stored in the contact memory along with the URI information associated with each of the stored contacts, wherein the PTC server initiates an internet session with an internet site corresponding to the location contact, the internet site having transportation information associated, if the location contact is an internet address contact in a contact database stored in the contact memory, and wherein the IMS network server receives session identification information from the internet access management server identifying the internet session initiated thereby, and wherein the user entity controller joins the internet session in response to receiving the session identification information.

13. The IMS wireless communication system of claim 7 wherein the user input keys include a PTT key and wherein the user entity input is a PTT input.

14. The IMS wireless communication system of claim 13 wherein the up-to-date transportation information comprises one of a plurality of chat group sessions, and wherein the user entity controller determines a location of the user entity, and wherein the IMS network controller determines whether one of the chat group sessions is desired up-to-date transportation information in response to the location of the user entity.

15. The IMS wireless communication system of claim 14 further comprising a Push to Commute (PTC) server coupled to the IMS network controller for receiving the revised SIP therefrom and comprising a registered user entity memory, and wherein the IMS network controller generates a set of user entities in response to the location of the user entity and a list of registered user entities stored in the registered user entity memory.

16. The IMS wireless communication system of claim 14 wherein the user entity controller joins the one of the plurality of chat group sessions associated with the location of the user entity and provides the user with chat group participation options for defining the user entity participation in the one of the chat group sessions, the chat group participation options including the user entity controller taking the floor in the one of the plurality of chat group sessions and the user entity not having the floor in the one of the plurality of chat group sessions.

* * * * *